US007999799B2

(12) United States Patent
Fukuo

(10) Patent No.: US 7,999,799 B2
(45) **Date of Patent: *Aug. 16, 2011**

(54) DATA TRANSFER METHOD AND ELECTRONIC DEVICE

(75) Inventor: Motoo Fukuo, Shiga (JP)

(73) Assignee: AU Optronics Corporation, Hsin-Chu (TW)

( * ) Notice: Subject to any disclaimer, the term of this patent is extended or adjusted under 35 U.S.C. 154(b) by 1395 days.

This patent is subject to a terminal disclaimer.

(21) Appl. No.: 11/085,200

(22) Filed: Mar. 22, 2005

(65) Prior Publication Data

US 2005/0219189 A1 Oct. 6, 2005

(30) Foreign Application Priority Data

Mar. 31, 2004 (JP) ................................ 2004-102294

(51) Int. Cl.
*G06F 3/038* (2006.01)

(52) U.S. Cl. .......................... 345/204; 345/98; 345/100

(58) Field of Classification Search .................. 345/204, 345/100, 98

See application file for complete search history.

(56) References Cited

U.S. PATENT DOCUMENTS

| | | | | |
|---|---|---|---|---|
| 6,335,718 | B1 | 1/2002 | Hong et al. | |
| 6,356,260 | B1 | 3/2002 | Montalbo | |
| 6,480,180 | B1 * | 11/2002 | Moon | 345/98 |
| 6,862,015 | B2 | 3/2005 | Fujioka et al. | |
| 6,954,200 | B2 | 10/2005 | Kim | |
| 7,075,505 | B2 | 7/2006 | Sakaguchi et al. | |
| 7,102,609 | B2 | 9/2006 | Saitou et al. | |
| 7,193,597 | B2 | 3/2007 | Sunohara | |
| 7,719,525 | B2 | 5/2010 | Fukuo | |
| 2001/0054997 | A1 | 12/2001 | Fujioka et al. | |

(Continued)

FOREIGN PATENT DOCUMENTS

CN 1482507 A 3/2004

(Continued)

OTHER PUBLICATIONS

Chinese Office Action dated Jun. 13, 2008 with an English translation.

(Continued)

*Primary Examiner* — Yong Sim
(74) *Attorney, Agent, or Firm* — CKC & Partners Co., Ltd.

(57) ABSTRACT

The present invention provides a liquid-crystal display device that is able to reduce EMI, current consumption, and so forth in an interchip transfer of display data, a timing signal, and so forth and to provide an appropriate timing margin. In an interchip transfer of display data, a timing signal, and so forth that uses a plurality of data drivers, a certain data driver is used as a data driver. When the data driver is used in a first stage, an internal receiver is made to function as an RSDS receiver by fixing the IFM terminal at the "H" level. The received RSDS signal constitutes a CMOS signal that has been divided into two by the receiver and is output by the transmitter. Here, a data inversion signal is generated and output by the transmitter. When the data driver is used in the second or subsequent stage, the internal receiver is made to function as a CMOS receiver by fixing the IFM terminal at the "L" level. The received CMOS signal is output after being subjected to inversion control by means of the data inversion signal by the receiver and transmitter.

16 Claims, 12 Drawing Sheets

U.S. PATENT DOCUMENTS

| | | | | |
|---|---|---|---|---|
| 2002/0180684 | A1 | 12/2002 | Saitou et al. | |
| 2004/0017344 | A1 | 1/2004 | Takemoto | |
| 2005/0083289 | A1 | 4/2005 | Yang | |
| 2005/0219189 | A1 | 10/2005 | Fukuo | |
| 2005/0219235 | A1* | 10/2005 | Fukuo | 345/204 |

FOREIGN PATENT DOCUMENTS

| | | |
|---|---|---|
| JP | 3-285332 | 12/1991 |
| JP | 11-194748 | 7/1999 |
| JP | 11-346337 | 12/1999 |
| JP | 2000-207077 | 7/2000 |
| JP | 2001-174843 | 6/2001 |
| JP | 2001-331150 | 11/2001 |
| JP | 2001-356737 | 12/2001 |
| JP | 2002-32063 | 1/2002 |
| JP | 2002-62840 | 2/2002 |
| JP | 2002-323877 | 11/2002 |
| JP | 2003-60061 | 2/2003 |
| JP | 2003-084726 | 3/2003 |
| JP | 2003-84726 | 3/2003 |
| JP | 2005-284217 | 10/2005 |

OTHER PUBLICATIONS

Chinese Office Action dated Oct. 30, 2009 with a Japanese translation and a partial English translation thereof.

Japanese Office Action dated Feb. 23, 2010 with a partial English translation thereof.

United States Office Action dated Jul. 21, 2010 in U.S. Appl. No. 11/802,178.

* cited by examiner

IFM="H"

IFM="H"

DATA TRANSFER METHOD AND ELECTRONIC DEVICE

BACKGROUND OF THE INVENTION

1. Field of the Invention

The present invention relates to a data transfer method and electronic device and, more particularly, to a data transfer method and electronic device whereby data is sequentially transferred to a plurality of cascade-connected semiconductor integrated circuits.

2. Description of the Related Art

Liquid crystal display devices are used as dot matrix-type display devices in a variety of devices such as personal computers based on the merits of their thin form, light weight, and low power, with active matrix-type color liquid crystal display devices, which are useful in controlling images in particular highly accurately, holding the mainstream.

A liquid crystal display module of a liquid crystal display device comprises a liquid crystal panel (LCD panel), a control circuit (referred to as a 'controller' hereinbelow) consisting of a semiconductor integrated circuit device (referred to as an 'IC' hereinbelow), a scan-side driver circuit (referred to as a 'scan driver' hereinbelow) and a data-side driver circuit (referred to as a 'data driver' hereinbelow). The scan driver and the data driver consist of an IC. In many cases, a plurality of data drivers is provided, for example, in a case where the liquid crystal panel resolution is XGA (1024×768 pixels: one pixel is made up of three dots of R (red), G (green), and B (blue)) and in the case of a 262144 color display (R, G, and B each have 64 grayscales), there is an arrangement of eight data drivers, where a single data driver is assigned the display of 128 pixels. Here, it is necessary to run wiring outside the data driver in order to transfer display data, a timing signal, and so forth from the controller to each data driver. Therefore, area for the layout is required. Therefore, in order to keep the layout as small as possible, as a system for transferring display data, a timing signal, and so forth from the controller to each data driver, the cascade system, in which a transfer is made from the controller only to an initial-stage data driver and sequentially via an IC as per the start signal transfer method of the prior art to data drivers of a second-stage and subsequent stages (referred to as the 'interchip transfer system' hereinbelow) is employed (See Japanese Patent No. 3416045, for example).

On the other hand, in the case of a signal transfer between ICs within a liquid crystal display module, a CMOS interface, which constitutes means for transmitting a twin-value voltage signal the amplitude of which changes between the supply voltage ("H" level) and ground ("L" level), is employed according to the prior art. As the detail and size of the image of the liquid crystal panel increases, the number of pixels of the liquid crystal panel also increases, and there has also be an expansion in the marketplace from XGA to SXGA (1280×1024 pixels) and to UXGA (1600×1200 pixels). Accordingly, the clock frequency corresponding to the liquid crystal panel is, in the case of XGA, currently about 60 MHz but is a higher clock frequency for SXGA and above. Although high-speed transfers of clock signals, display data, and so forth are required between the controller and data drivers within a liquid crystal display module, there has been the problem that, in the case of a conventional CMOS interface, the number of wires increases when the parallel transmission system must be adopted in order to prevent EMI (Electromagnetic Interference) noise.

Accordingly, in order to resolve the above problem for XGA and above, an interface of a small-amplitude differential signal transmission system has been used. As a representative example, an interface of the RSDS (Reduced Swing Differential Signaling: registered trademark of National Semiconductor) system (referred to as an 'RSDS interface' hereinbelow) has been used (See Japanese Patent No. 3285332).

Further, in cases where an RSDS interface is used in the above interchip transfer of display data, a timing signal, and so forth, although the EMI noise between the controller and the initial-stage data driver is reduced, the display data and clock signal must be transferred to the second data driver and subsequent data drivers at the same frequency. However, because the length of the wiring on the glass substrate between the data drivers is long in comparison with the length of the wiring on the glass substrate that governs the impedance (mainly resistance) of the wiring between the controller and the initial-stage data driver, the wiring resistance between the data drivers is large in comparison with the wiring resistance between the controller and the initial-stage data driver and, hence, the setup/hold margin when display data is captured at the edge of the clock signal by means of the data drivers of the second and subsequent stages is reduced, meaning that there is the risk that the display data cannot be captured accurately. Further, in cases where an RSDS interface is used in the transfer of display data between data drivers, there is the problem that a fixed current must flow in order to transmit the RSDS signal and the current consumption is large.

SUMMARY OF THE INVENTION

According to one aspect of the present invention, there is provided a data transfer method for sequentially transferring data from a first semiconductor integrated circuit to a plurality of cascade-connected second semiconductor integrated circuits, wherein the data is transferred between the first semiconductor integrated circuit and the initial-stage second semiconductor integrated circuit by means of a differential signal and the data is transferred between each of the second semiconductor integrated circuits by means of a CMOS signal.

According to another aspect of the present invention, there is provided an electronic device comprises a first semiconductor integrated circuit, and a plurality of cascade-connected second semiconductor integrated circuits for receiving a data from the first semiconductor integrated circuit and sequentially transferring the data, wherein the data is transferred by means of a differential signal between the first semiconductor integrated circuit and the initial-stage second semiconductor integrated circuit and is transferred by means of a CMOS signal between each of the second semiconductor integrated circuits.

As a result of the means described above, the transfer of data between second semiconductor integrated circuits with a large wiring resistance in comparison with a transfer between a first semiconductor integrated circuit and an initial-stage second semiconductor integrated circuit is performed by means of a CMOS signal with a long cycle and large amplitude (driving capacity) by means of a differential signal, whereby a setup/hold margin can be adequately obtained when the data is captured by each semiconductor integrated circuit.

The present invention makes it possible to reduce the EMI, current consumption and so forth in an interchip transfer of data and a timing signal and to provide an appropriate timing margin for the capture of data.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

Figure 1:
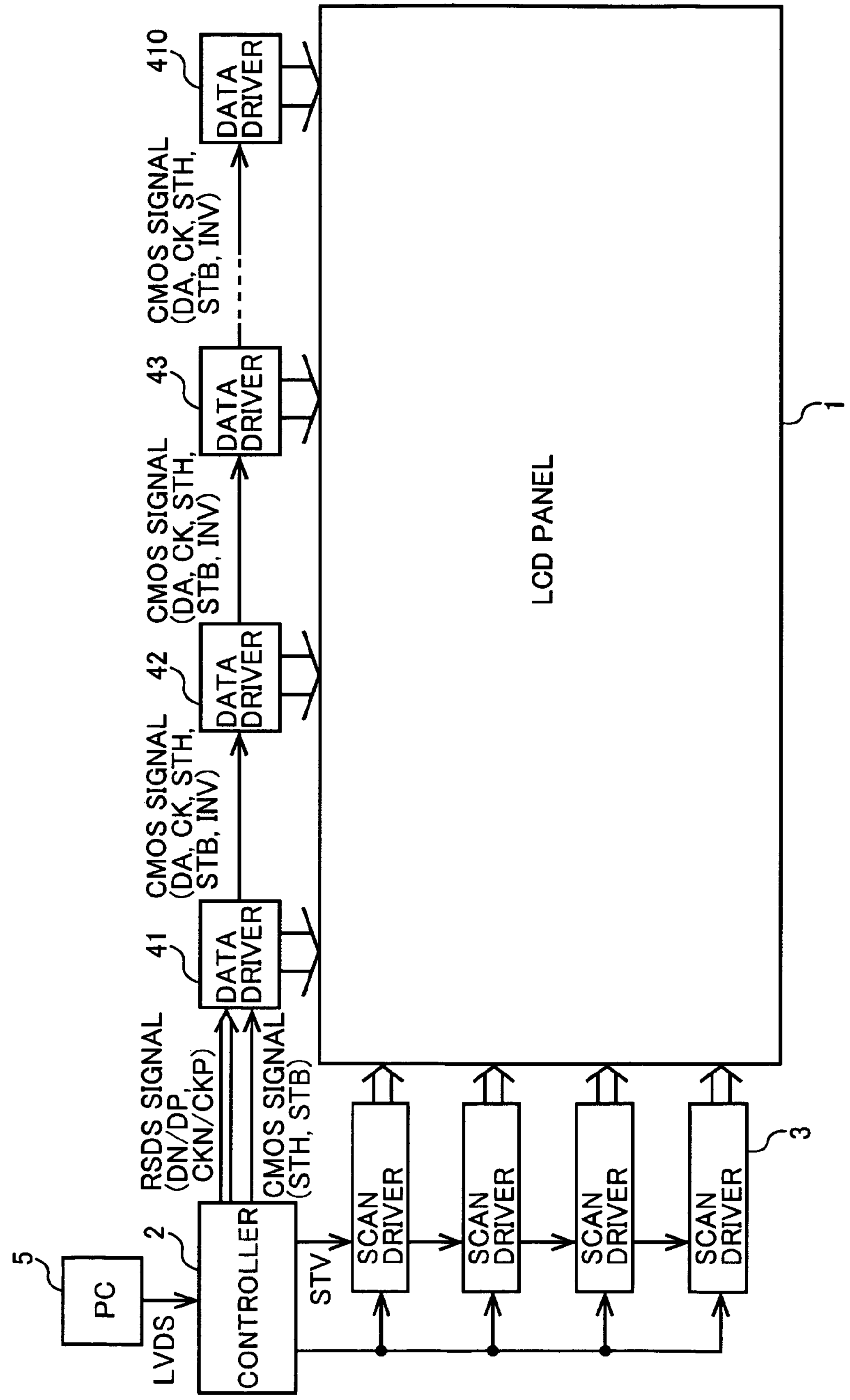
FIG. 1 is a block diagram showing the overall constitution of a liquid crystal display module of a first embodiment of the present invention.

Where the codes for the display data, timing signal, and so forth used in the following description are concerned, CMOS signals and RSDS signals are defined below for the purposes of clarification.

(1) Display data DATA: no distinction between CMOS signal, RSDS signal, and so forth (2) Display data DA: CMOS signal (3) Display data D00 to D05, D10 to D15, D20 to D25: CMOS signal (4) Display data DN/DP: RSDS signal (5) Display data D00N/D00P to D02N/D02P, D10N/D10P to D12N/D12P, D20N/D20P to D22N/D22P: RSDS signal (6) Clock signal CLK: no distinction between CMOS signal, RSDS signal, and so forth (7) Clock signal CK: CMOS signal (8) Clock signal CKN/CKP: RSDS signal (9) Start signal STH, latch signal STB, data inversion signal INV: CMOS signal The invention will be now described herein with reference to illustrative embodiments. Those skilled in the art will recognize that many alternative embodiments can be accomplished using the teachings of the present invention and that the invention is not limited to the embodiments illustrated for explanatory purposed.

A first embodiment of the present invention will be described below with reference to the drawings. A liquid crystal display module of a liquid crystal display device comprises, as shown in FIG. 1, a liquid crystal panel 1, a controller 2, scan drivers 3, and data drivers 4. Although not illustrated in detail, the liquid crystal panel 1 comprises a structure that is produced by placing two substrates opposite one another, namely, a semiconductor substrate on which a transparent pixel electrode and a thin-film transistor (TFT) are arranged and an opposite substrate over the entire surface of which one transparent electrode is formed, and then enclosing liquid crystals between the two substrates. The liquid crystal panel 1 displays an image by applying a predetermined voltage to each pixel electrode by controlling a TFT with a switching function to change the transmittance or reflectance of the liquid crystals in accordance with the potential difference between the respective pixel electrodes and the opposing substrate electrode. Scan lines that send the switching control signal (scanning signal) of the TFT and data lines that send grayscale voltages that are applied to the respective pixel electrodes are arranged on the semiconductor substrate. A case of a 262144-color display (R, G, B each consist of 64 grayscales) where the resolution of the liquid crystal panel 1 is SXGA (1280×1024 pixels: one pixel consists of 3 dots for R, G, and B) will be described below by way of example.

1024 scan lines of the liquid crystal panel 1 are arranged in correspondence with 1024 pixels in a vertical direction. Further, because one pixel consists of three dots for R, G, and B, 1280×3=3840 data lines are arranged in correspondence with 1280 pixels in a horizontal direction. Four scan drivers 3 are arranged for 1024 gate lines such that one scan driver is assigned 256 gate lines. Ten data drivers 4 (41, 42, . . . , 410) are arranged for 3840 data lines such that one data driver is assigned 384 data lines.

Display data and a timing signal, and so forth are transferred to the controller 2 from a PC (personal computer) 5 via an LVDS (Low Voltage Differential Signaling) interface, for example. Clock signals are transferred from the controller 2 in parallel to the respective scan drivers 3 and a vertical synchronization start signal STV is transferred to an initial-stage scan driver 3 and sequentially transferred to the second and subsequent cascade-connected scan drivers 3. A horizontal synchronization start signal STH and latch signal STB that consist of a CMOS signal are transferred by the controller 2 to the initial-stage data driver 41 via the CMOS interface and the display data DN/DP and clock signal CKN/CKP that consist of an RSDS signal are transferred to the initial-stage data driver 41 via the RSDS interface. Display data DA, the clock signal CK, start signal STH, latch signal STB, and data inversion signal INV, which consist of a CMOS signal, are sequentially transferred by the initial-stage data driver 41 to the cascade-connected second and subsequent stage data drivers 42, 43, . . . , 410 via the CMOS interface. The data inversion signal INV is generated by the initial-stage data driver 41 on the basis of previous and subsequent display data DA.

A pulse-shaped scanning signal is sent in sequence by the scan drivers 3 to each of the scan lines of the liquid crystal panel 1. The TFTs associated with the scan lines to which the pulse is applied are all on, and, thereupon, grayscale voltages are supplied by each of the data drivers 4 to the data lines of the liquid crystal panel 1 and are applied to the pixel electrodes via the TFTs that are on. Further, when the TFTs associated with scan lines to which a pulse has not been applied change to the off state, the potential difference between the pixel electrodes and the opposing substrate electrodes is held on until the subsequent grayscale voltage is applied to the pixel electrode. Further, a predetermined grayscale voltage is applied to all of the pixel electrodes by applying a pulse sequentially to all of the scan lines and an image can be displayed by rewriting the grayscale voltage in the frame cycle.

Figure 2:
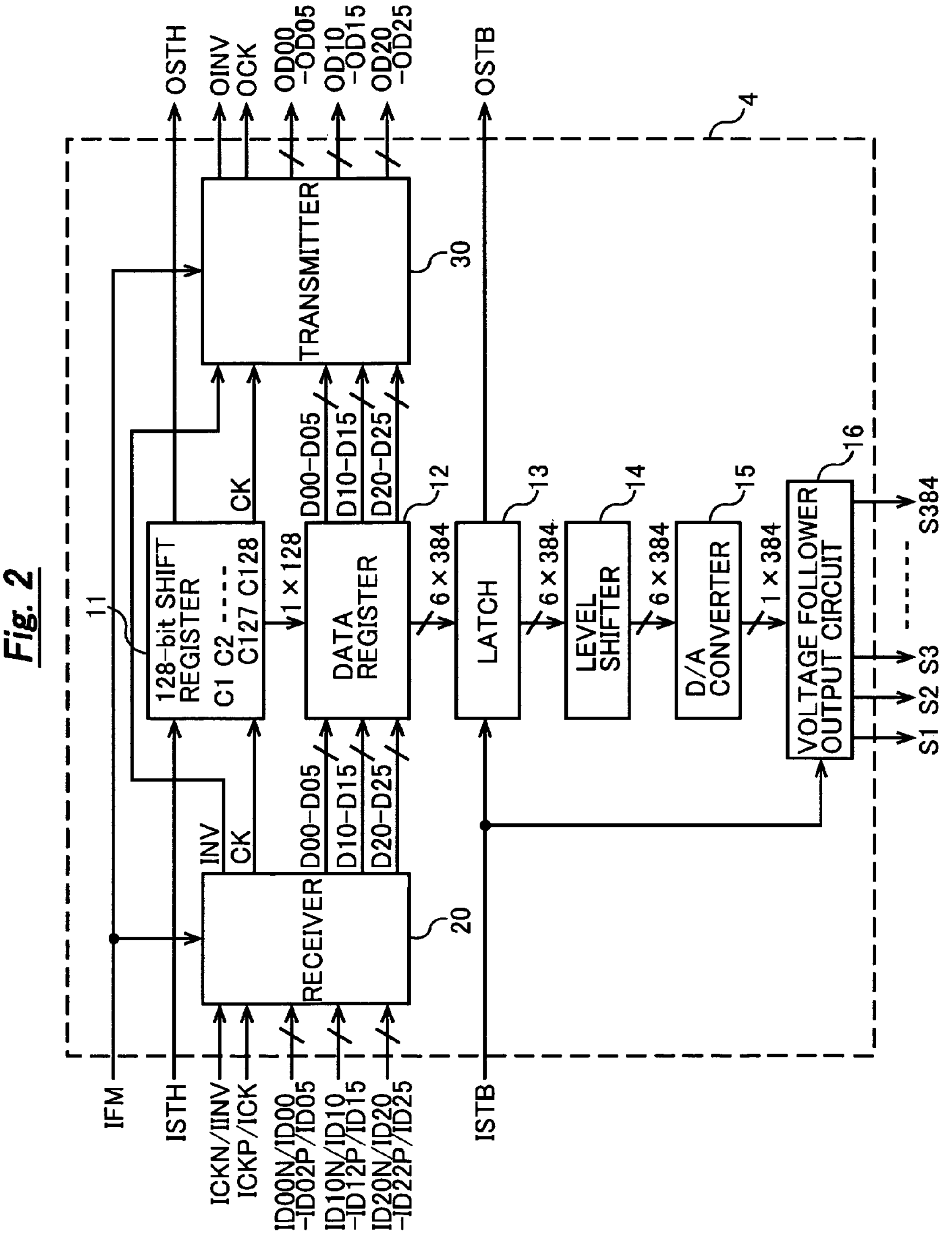
FIG. 2 is a block diagram showing the overall constitution of a data driver 4 that is used in the liquid crystal display module shown in FIG. 1.

The data driver 4 has six bits of display data for each of R, G, and B for displaying 64 grayscales for each of R, G, and B input thereto in correspondence with 384 data lines and is constituted with 384 outputs to each of which, of the 64 grayscales, one grayscale voltage corresponding with the logic of the display data is output. As for the specific circuit constitution, as shown in FIG. 2, the data driver 4 comprises, in addition to a shift register 11 that constitutes a circuit for performing serial/parallel conversion on the digital display data DA and for performing a conversion to analog grayscale voltages corresponding with the logic of the display data DA, a data register 12, a latch 13, a level shifter 14, a digital analog conversion circuit (referred to as a 'D/A converter' hereinbelow) 15 and a voltage follower output circuit 16, a receiver 20 and transmitter 30 that constitute an interface circuit for an interchip data transfer. The data driver 4 comprises a power supply circuit for operating each of the above circuits but drawings and a description are omitted here.

Each of the terminals shown in FIG. 2 will now be described as an input terminal of the data driver 4. The IFM terminal is a terminal for selecting a CMOS or RSDS interface mode. An "H" level or "L" level fixed potential is supplied as an interface mode select signal to the IFM terminal and this potential is input to the receiver 20 and transmitter 30. The ISTH terminal is an input terminal for the start signal STH and the start signal STH is input to the shift register 11. The ISTB terminal is an input terminal for the latch signal STB and the latch signal STB is input to the latch 13 and voltage follower output circuit 16. The ICKP/ICK terminal and the ICKN/IINV terminal are input terminals for the clock signal CKN/CKP when the IFM terminal="H" level and, when the IFM terminal="L" level, the ICKP/ICK terminal is the input terminal for the clock signal CK and the ICKN/IINV terminal is the input terminal for the data inversion signal INV. The clock signals CKN/CKP and CK and the data inversion signal INV are each input to the receiver 20. The ID00N/ID00 to ID02P/ID05 terminals, the ID10N/ID10 to ID12P/ID15 terminals, and the ID20N/ID20 to ID22P/ID25 terminals are input terminals for display data DATA corresponding to a bit width of 6 grayscale display bits×3 dots (one pixel) of R, G, B=18 bits and, when the IFM terminal="H" level, are input terminals for display data D00N/D00P-D02N/D02P, D10N/D10P-D12N/D12P, D20N/D20P-D22N/D22P (referred to as DN/DP hereinbelow) that consist of an RSDS signal and, when the IFM terminal="L" level, are input terminals for display data D00-D05, D10-D15, and D20-D25 (referred to as 'DA' hereinbelow) that consist of a CMOS signal. Each of the display data DATA above is input to the receiver 20.

Each of the terminals shown in FIG. 2 will now be described as the output terminals of the data driver 4. The OSTH terminal is an output terminal for the start signal STH and the start signal STH is output by the shift register 11. The OSTB terminal is an output terminal for the latch signal STB and the latch signal STB is output by the latch 13. The OCK terminal is an output terminal for the clock signal CK and the clock signal CK is output by the transmitter 30. The OINV terminal is an output terminal for the data inversion signal INV and the data inversion signal INV is output by the transmitter 30. The OD00 to OD05 terminals, the OD10 to OD15 terminals and the OD20 to OD25 terminals are output terminals for the display data DA and the respective display data DA are each output by the transmitter 30.

The shift register 11, data register 12, latch 13, level shifter 14, D/A converter 15 and voltage follower output circuit 16 will be described simply below. The shift register 11 consists of 128 bits (where one bit is assigned three of the data lines R, G, B) in correspondence with the 384 data lines and, for each single horizontal period in which one scan line is scanned among the plurality of scan lines of the liquid crystal panel 1, the "H" level of the start signal STH is read at the timing of the leading edge and trailing edge of the clock signal CK and data-capture control signals C1, C2, . . . , C128 are sequentially generated and supplied to the data register 12. The data register 12 captures, in each single horizontal period and in correspondence with the 384 data lines, display data DA corresponding to one scan line that is supplied by means of 128 bits×an 18-bit width of six bits×three dots (R, G, B) at the timing of the trailing edge of control signals C1, C2, . . . , C128 of the shift register 11. In each single horizontal period, the latch 13 holds the display data DA that is captured by the data register 12 with the timing of the leading edge of the latch signal STB and supplies the display data altogether to the level shifter 14. The level shifter 14 supplies the display data DA from the latch 13 to the D/A converter 15 by raising the voltage level. In accordance with the display data DA from the level shifter 14, the D/A converter 15 supplies one grayscale level voltage corresponding with the logic of the display data DA among the sixty-four grayscales to the voltage follower output circuit 16 for each of the 6-bit display data DA corresponding with the 384 data lines. The voltage follower output circuit 16 outputs the grayscale voltages from the D/A converter 15 as the outputs S1 to S384 with the timing of the trailing edge of the latch signal STB by raising the driving capacity.

Figure 3:
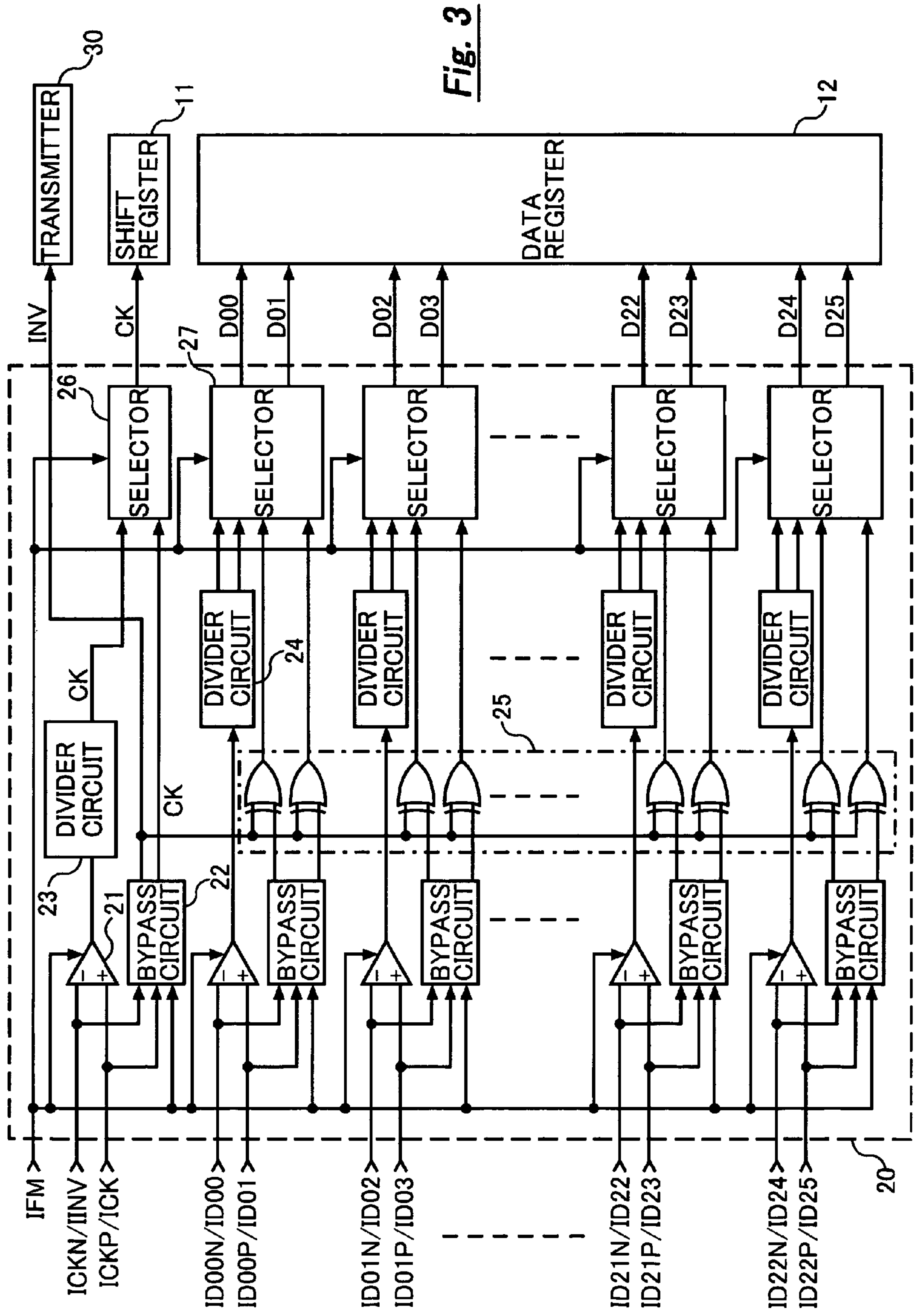
FIG. 3 is a circuit diagram showing a receiver 20 that is used in the data driver 4 shown in FIG. 2.
Figure 4A:
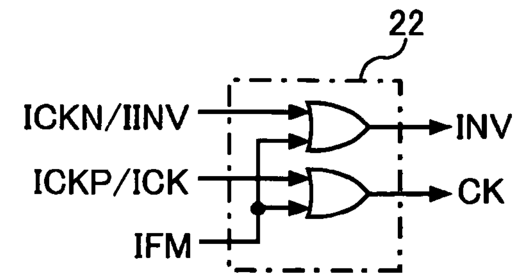
FIGS. 4A and 4B are circuit diagrams showing a bypass circuit 22 that is used in the receiver 20 shown in FIG. 3.
Figure 4B:
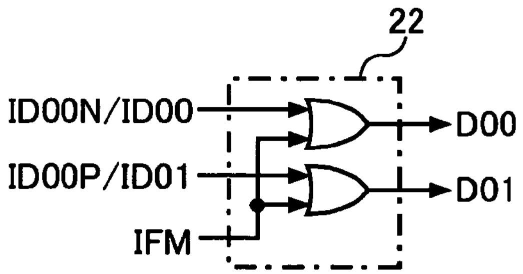

The receiver 20 and transmitter 30 that constitute the interface circuit for an interchip transfer will be described in detail next. The receiver 20 receives a clock signal CLK, and the display data DATA, and so forth, which consist of an RSDS signal or a CMOS signal and outputs the clock signal CK and display data DA, and so forth, which consist of a CMOS signal to the internal shift register 11 and data register 12, and so forth. As shown in FIG. 3, the receiver 20 comprises an RSDS receiver 21 to which the clock signal CKN/CKP and display data DN/DP are input, a bypass circuit 22 whereby the clock signal CK, data inversion signal INV and display data DA are bypassed, a divider circuit 23, a divider circuit 24, a data inversion circuit 25 consisting of EXOR circuits, a selector 26 for selecting the clock signal CK from the divider circuit 23 and the clock signal CK from the bypass circuit 22, and a selector 27 for selecting display data DA from a divider circuit 24 and the display data DA from the data inversion circuit 25. When the IFM terminal="H" level, each of the RSDS receivers 21 enters an operational state in which the internal bypass signal is on and clock signal CKN/CKP and display data DN/DP can be received and, when the IFM terminal="L" level, each of the RSDS receivers 21 enters a non-operational state as a result of the internal bypass signal being turned off, whereby current consumption is reduced. Each of the bypass circuits 22 is constituted by two OR circuits as shown in FIG. 4, for example, and, when the IFM terminal="L" level, the clock signal CK, the data inversion signal INV and display data DA are bypassed and, when the IFM terminal="H" level, the bypassing of a CMOS signal is prohibited.

The divider circuit 23 divides the clock signal CK output by the RSDS receiver 21 into two and outputs the divided signals via one line. Each divider circuit 24 divides the display data D00-D01, D02-D03, . . . , D24-D25 that is output by each of the RSDS receivers 21 and contains data corresponding to two bits into individual-bit data D00, D01, . . . , D24, D25 and outputs these data by means of two lines. The data inversion circuit 25 performs inversion control on the display data DA from the bypass circuit 22 according to the data inversion signal INV from the bypass circuit 22 when the IFM terminal="L" level. The data inversion circuit 25 functions as a data second-order inversion circuit of a method which reduces the inversion frequency of all the transfer wiring by performing first-order inversion on the logic of the display data by means of a transfer-source data first-order inversion circuit in accordance with the data inversion signal INV and performs second order inversion to restore the logic to the original logic by means of a transfer-destination data second-order inversion circuit. The selector 26 selects and outputs the clock signal CK from the divider circuit 23 when the IFM terminal="H" level and selects and outputs the clock signal CK from the bypass circuit 22 when the IFM terminal="L" level. The selector 27 selects and outputs the display data D00-D01, D02-D03, . . . , D24-D25 from the divider circuit 24 when the IFM terminal="H" level and selects and outputs the display data D00-D01, D02-D03, . . . , D24-D25 from the data inversion circuit 25 when the IFM terminal="L" level.

Figure 5:
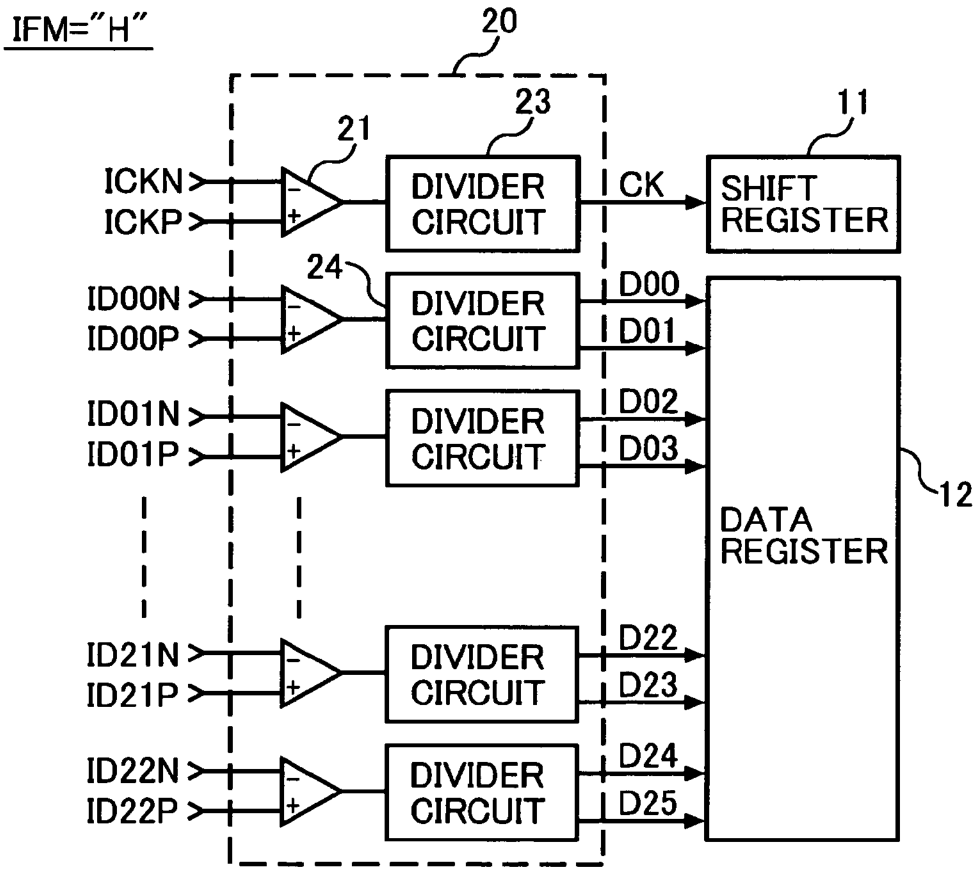
FIG. 5 shows the operating state when the IFM of the receiver 20 shown in FIG. 3="H"

The operation of the receiver 20 when the IFM terminal="H" level will now be described. Each of the RSDS receivers 21 is in an operational state and the bypass circuit 22 prohibits bypassing of a CMOS signal. The selector 26 selects the output of the divider circuit 23 and the selector 27 selects the output of the divider circuit 24. As a result of these operations, the receiver 20 functions as an RSDS receiver as shown in FIG. 5. Therefore, here, when the clock signal CKN/CKP and display data DN/DP are input to the receiver 20, each of the RSDS receivers 21 receives the clock signal CKN/CKP and display data DN/DP, whereupon the receiver 20 outputs the clock signal CK from the divider circuit 23 and the display data DA from the divider circuit 24.

Figure 6:
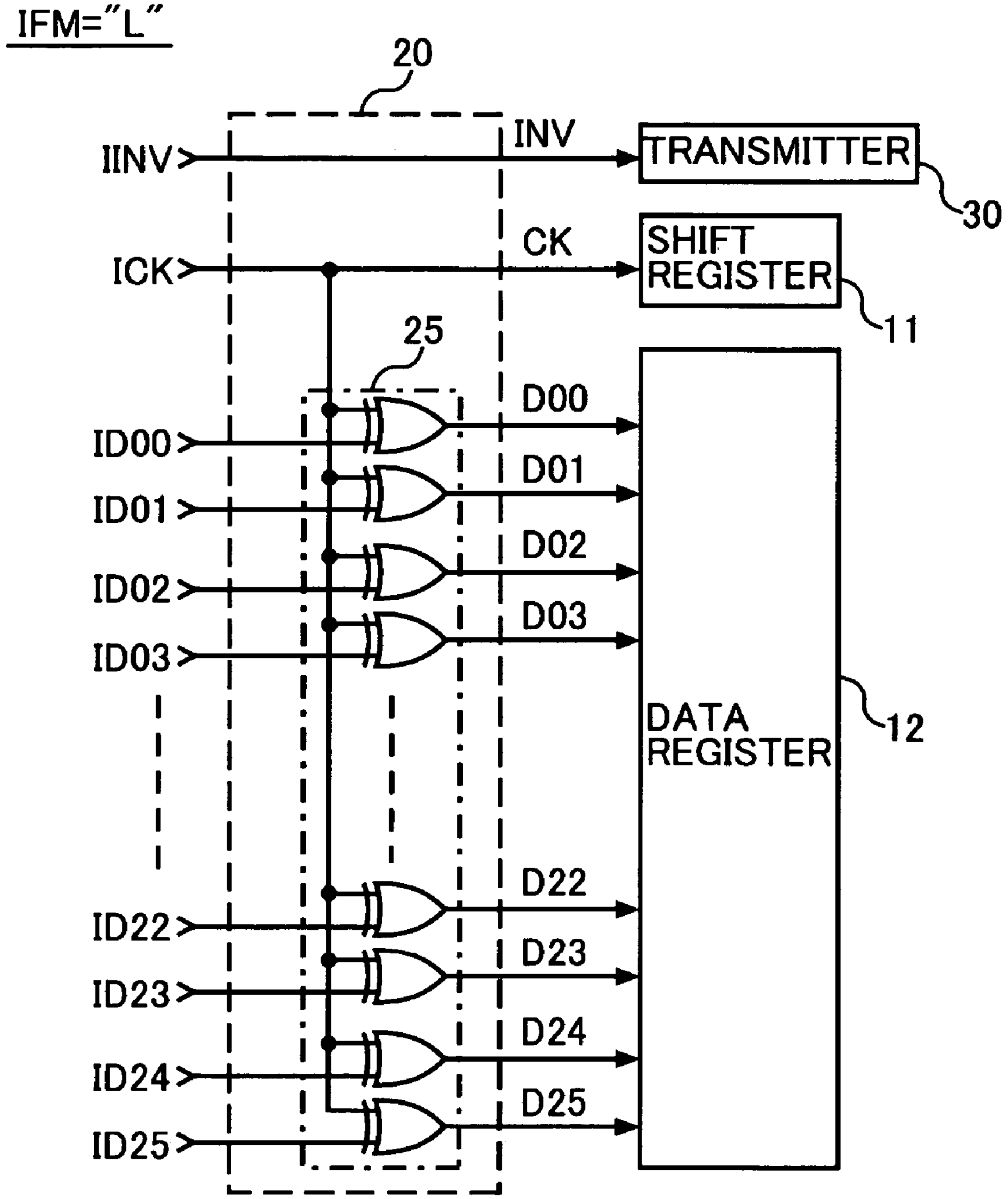
FIG. 6 shows the operating state when the IFM of the receiver 20 shown in FIG. 3="L"
Figure 7:
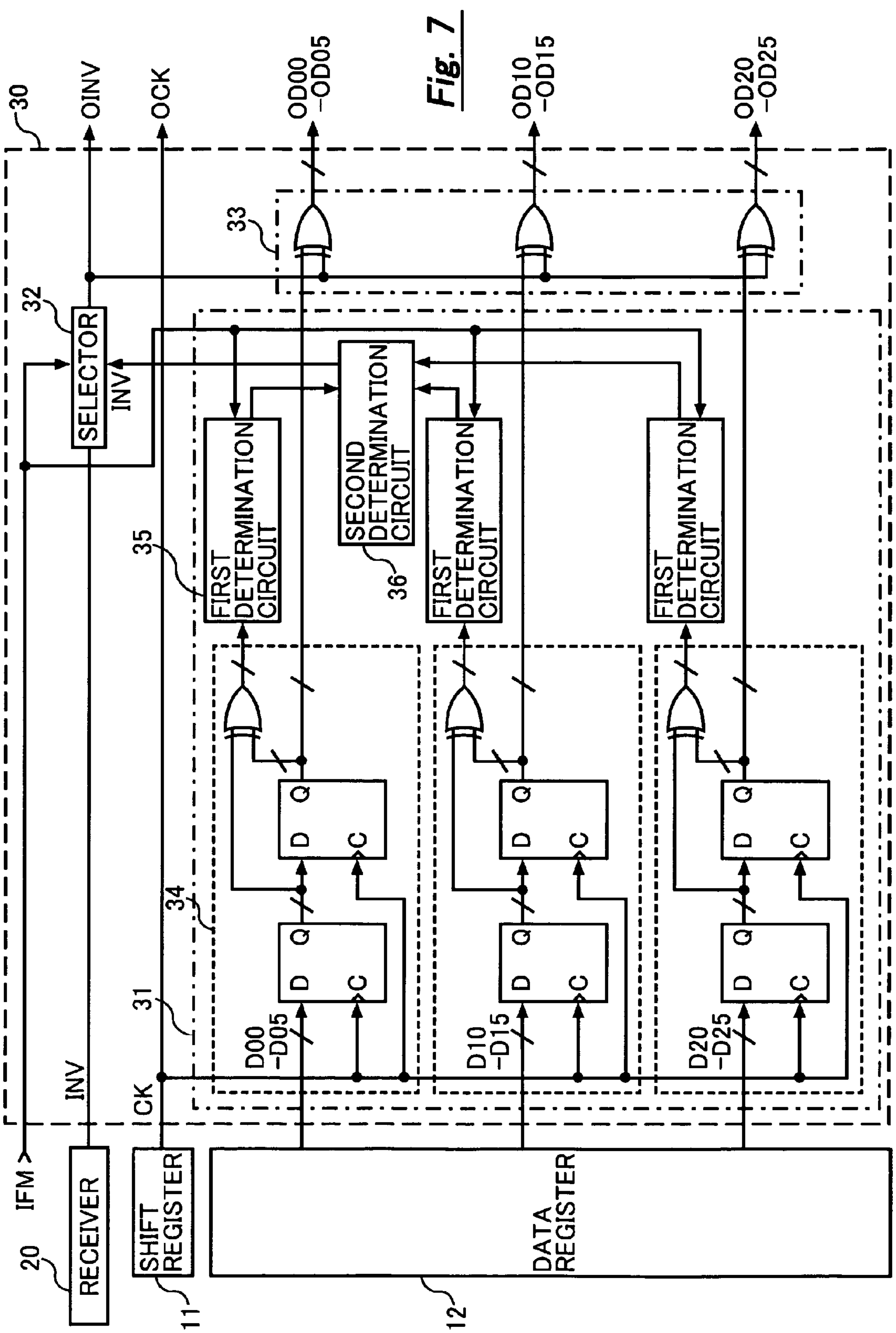
FIG. 7 is a circuit diagram showing the transmitter 30 that is used in the data driver 4 shown in FIG. 2.

The operation of the receiver 20 when the IFM terminal="L" level will be described next. Each of the RSDS receivers 21 is in a non-operational state and the respective bypass circuits 22 bypass the clock signal CK, data inversion signal INV and display data DA. The selector 26 selects the clock signal output of the bypass circuit 22 and the selector 27 selects the output of the data inversion circuit 25. As a result of these operations, the receiver 20 functions as a CMOS receiver as shown in FIG. 6. Therefore, here, when the clock signal CK and display data DA are input to the receiver 20, each of the bypass circuits 22 bypasses these CMOS signals and the clock signals CK from the respective bypass circuits 22 are output by the receiver 20 and the display data DA from the data inversion circuit 25 is output by the receiver 20.

The transmitter 30 comprises a data inversion signal generation circuit 31, a selector 32, and a data inversion circuit 33. The transmitter 30 receives signals from the internal shift register 11, data register 12, and so forth and transmits the clock signal CK, display data DA, and so forth to a subsequent-stage data driver 4.

The data inversion signal generation circuit 31 comprises a data inversion detection circuit 34, a first determination circuit 35, and a second determination circuit 36. The data inversion signal generation circuit 31 comprises three data inversion detection circuits 34 to correspond with each of the 6-bit display data DA of R, G, B. In order to detect previous and subsequent changes in each of the six bits, each of the data inversion detection circuits 34 comprises, in correspondence with each bit, two-stage cascade-connected flip-flops and an EXOR circuit that outputs the exclusive OR of the output of each stage and outputs an "L" level for a bit for which there is no change before or after the bit and "H" for a bit for which there is a change. The data inversion signal generation circuit 31 comprises three first determination circuits 35 to correspond with each of the data inversion detection circuits 34 and, when the IFM terminal="H" level, an operational state in which determination is possible is assumed and, when the IFM terminal="L" level, a non-operational state is assumed whereby the consumption is reduced. Each of the first determination circuits 35 detects the number of bits that have changed among the six bits and, when there are four or more bits, for example, outputs the "H" level. The second determination circuit 36 detects the number of outputs of the "H" level among the outputs of the three first determination circuits 35 and outputs "H" when there are two or more outputs. The output of the second determination circuit 36 is the data inversion signal INV.

The selector 32 selects and outputs the data inversion signal INV from the data inversion signal generation circuit 31 when the IFM terminal="H" level and selects and outputs the data inversion signal INV from the receiver 20 when the IFM terminal="L" level. The data inversion circuit 33 subjects the display data DA from the data inversion signal generation circuit 31 to inversion control in accordance with the data inversion signal INV from the selector 32. The data inversion circuit 33 functions as a data first-order inversion circuit of a method which reduces the inversion frequency of all the transfer wiring by performing first-order inversion on the logic of the display data by means of a transfer-source data first-order inversion circuit in accordance with the data inversion signal INV and performs second order inversion to restore the logic to the original logic by means of a transfer-destination data second-order inversion circuit.

Figure 8:
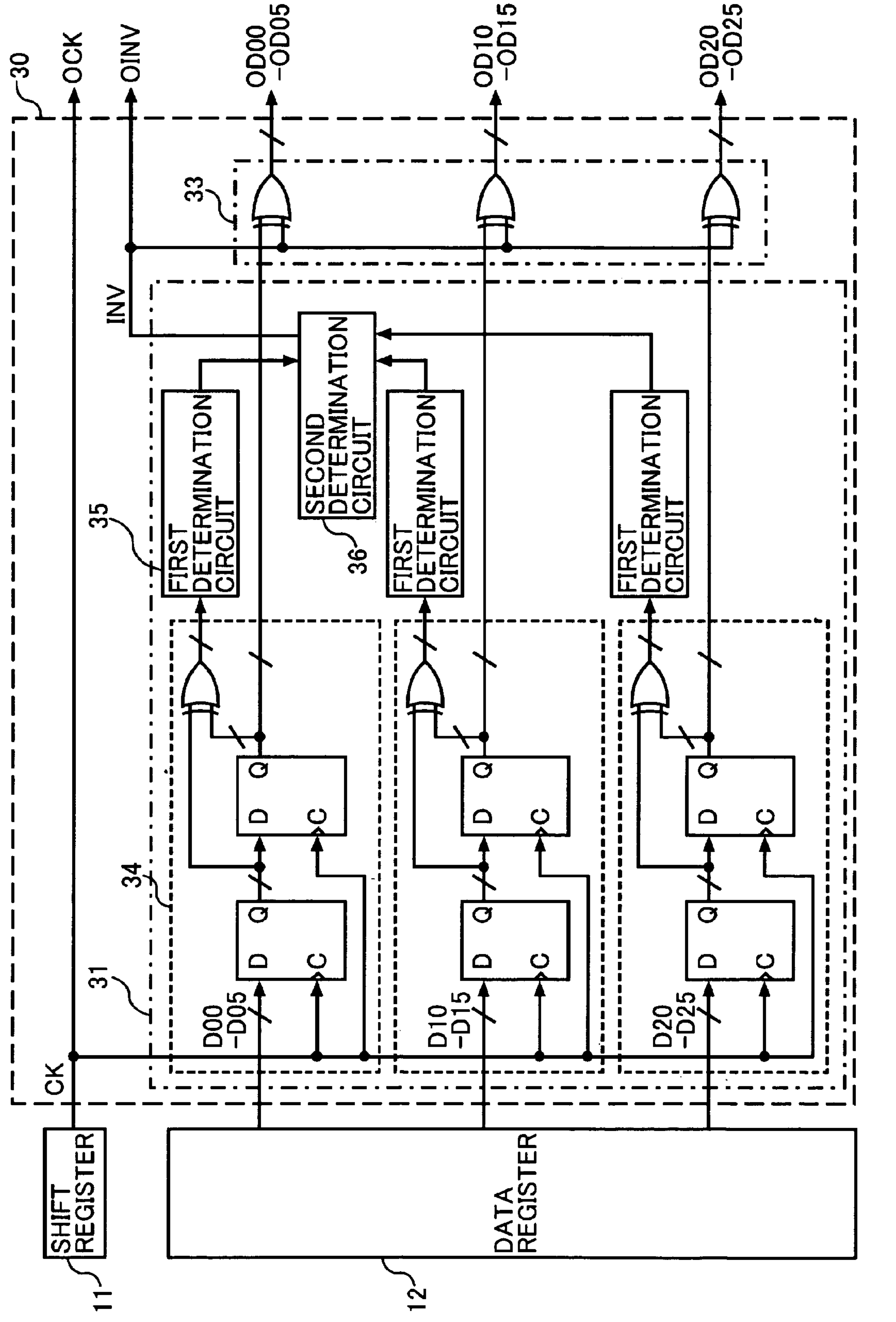
FIG. 8 shows the operating state when the IFM of the transmitter 30 shown in FIG. 7="H"

The operation of transmitter 30 when the IFM terminal="H" level will now be described. Each of the first determination circuits 35 is in an operational state and the selector 32 selects and outputs the data inversion signal INV from the data inversion signal generation circuit 31. As a result of these operations, when, as shown in FIG. 8, the display data DA is input to the data inversion signal generation circuit 31, previous and subsequent changes in each bit are detected by the data inversion detection circuit 34 and, based on the results, the number of changed bits is detected by means of the first determination circuit 35 and second determination circuit 36, whereupon the output of the second determination circuit 36 is output by the data inversion signal generation circuit 31 to the OINV terminal and data inversion circuit 33 as the data inversion signal INV. Further, the display data DA that is input via the data inversion signal generation circuit 31 is inverted by the data inversion circuit 33 in accordance with the data inversion signal INV and then output to the respective output terminals OD00 to OD05, OD10 to OD15, and OD20 to OD25.

Figure 9:
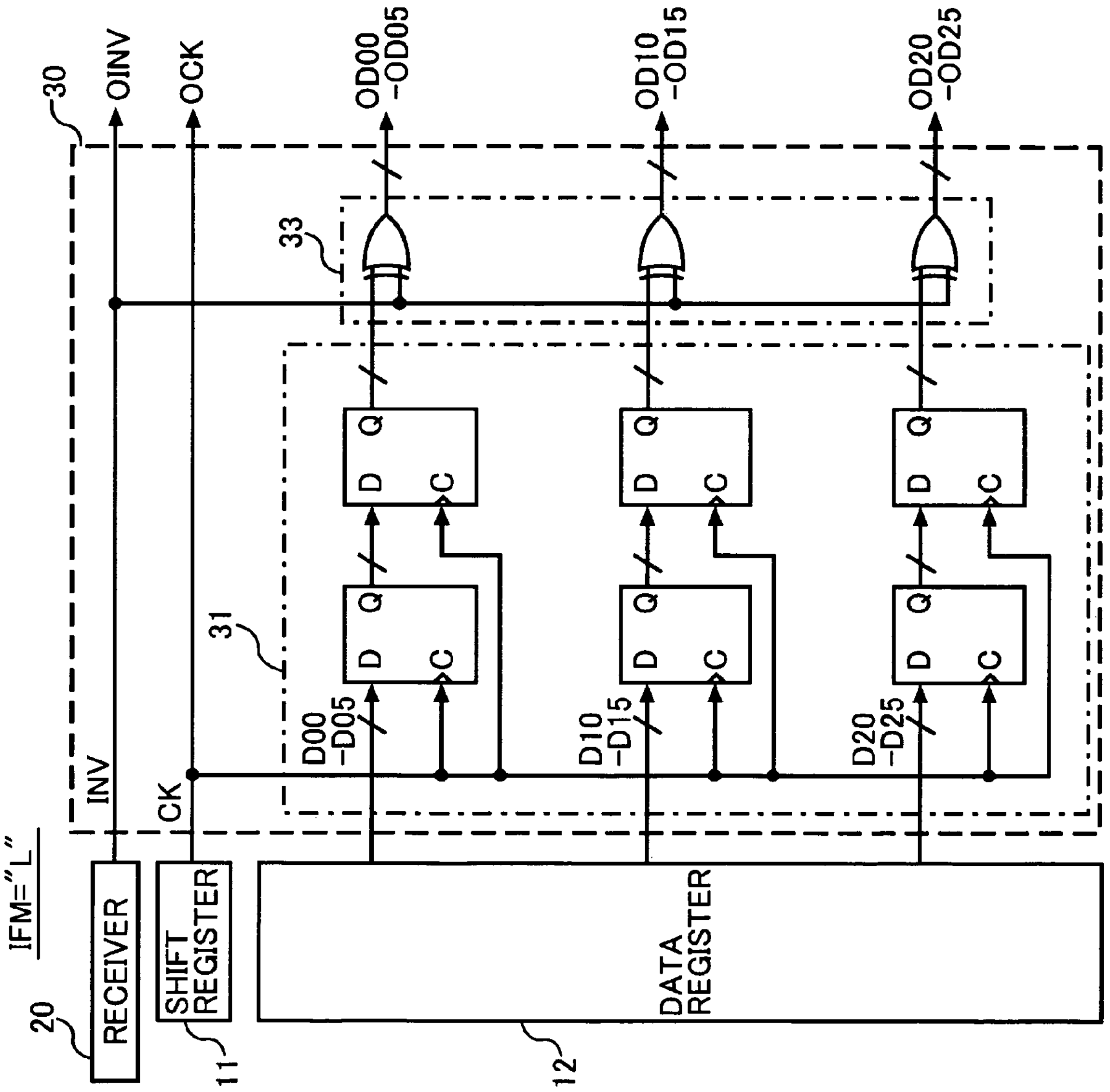
FIG. 9 shows the operating state when the IFM of the transmitter 30 shown in FIG. 7="L"

The operation of the transmitter 30 when the IFM terminal="L" level will be described next. Each of the first determination circuits 35 is in a non-operational state and the selector 32 selects and outputs the data inversion signal INV from the receiver 20. As a result of these operations, the data inversion signal INV from the receiver 20 is output to the OINV terminal and data inversion circuit 33, as shown in FIG. 9. Further, the display data DA that has been input to the data inversion circuit 33 via the data inversion signal generation circuit 31 is inverted by the data inversion circuit 33 in accordance with the data inversion signal INV and then output to the respective output terminals OD00 to OD05, OD10 to OD15, and OD20 to OD25.

Figure 10:
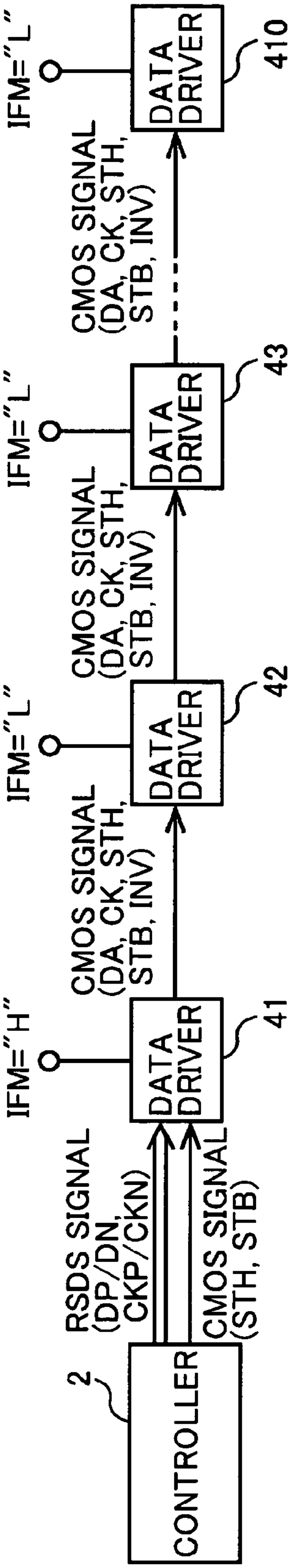
FIG. 10 illustrates the transfer of a variety of signals between the controller 2 and the data drivers 4 shown in FIG. 1.

As for the transfer of various signals between the controller 2 and data driver 4 and between each of the data drivers 4 of the liquid crystal display module shown in FIG. 1, the controller 2, data drivers 4, and various signal lines from the controller 2 to the data drivers 4 will now be described with reference to FIG. 10. The start signal STH and latch signal STB are transferred from the controller 2 to the data driver 41 by means of CMOS signals and sequentially transferred by the data driver 41 to each of the cascade-connected data drivers 42, 43, . . . , 410.

The transfer of the clock signal CLK, display data DATA and data inversion signal INV will now be described. The potential level of the IFM terminal of the data driver 41 is set at the "H" level and the potential level of the IFM terminal of the data drivers 42, 43, . . . , 410 is set at the "L" level. As a result, each of the RSDS receivers 21 of the data driver 41 enters an operational state and, as shown in FIG. 5, the receiver 20 of the data driver 41 functions as an RSDS receiver and an RSDS interface is constituted by the RSDS transmitter (not illustrated) of the controller 2, and the receiver 20 of the data driver 41. Therefore, the clock signal CKN/CKP and display data DN/DP from the controller 2 are transferred to the data driver 41 via the RSDS interface. The transmitter 30 of the data driver 41 outputs the clock signal CK and display data DA and functions as a CMOS transmitter.

Each of the receivers 21 of the data driver 42 is in a non-operational state and is bypassed and, as shown in FIG. 6, the receiver 20 the data driver 42 functions as a CMOS receiver and a CMOS interface is constituted by the transmitter 30 of the data driver 41 and the receiver 20 of the data driver 42. Therefore, the clock signal CK and display data DA from the data driver 41 are transferred to the data driver 42 via a CMOS interface. The transmitter 30 of the data driver 42 outputs the clock signal CK and display data DA and functions as a CMOS transmitter. The third and subsequent-stage data drivers 43, . . . , 410 function in the same way as the data driver 42 and the clock signal CK and display data DA are sequentially transferred via the CMOS interface circuit to the data drivers 43, . . . , 410. Further, each of the receivers 21 of the second and subsequent data drivers 42, 43, . . . , 410 is in a nonoperational state and, therefore, the current consumption by these receivers can be reduced.

The timing operation up until the display data DATA for the data driver 43 is input to the data driver 41 and transferred to the data driver 43 will be described next with reference to FIG. 11.

Figures 11A, 11B, 11C, 11D, 11E, 11F, 11G, 11H, 11I:
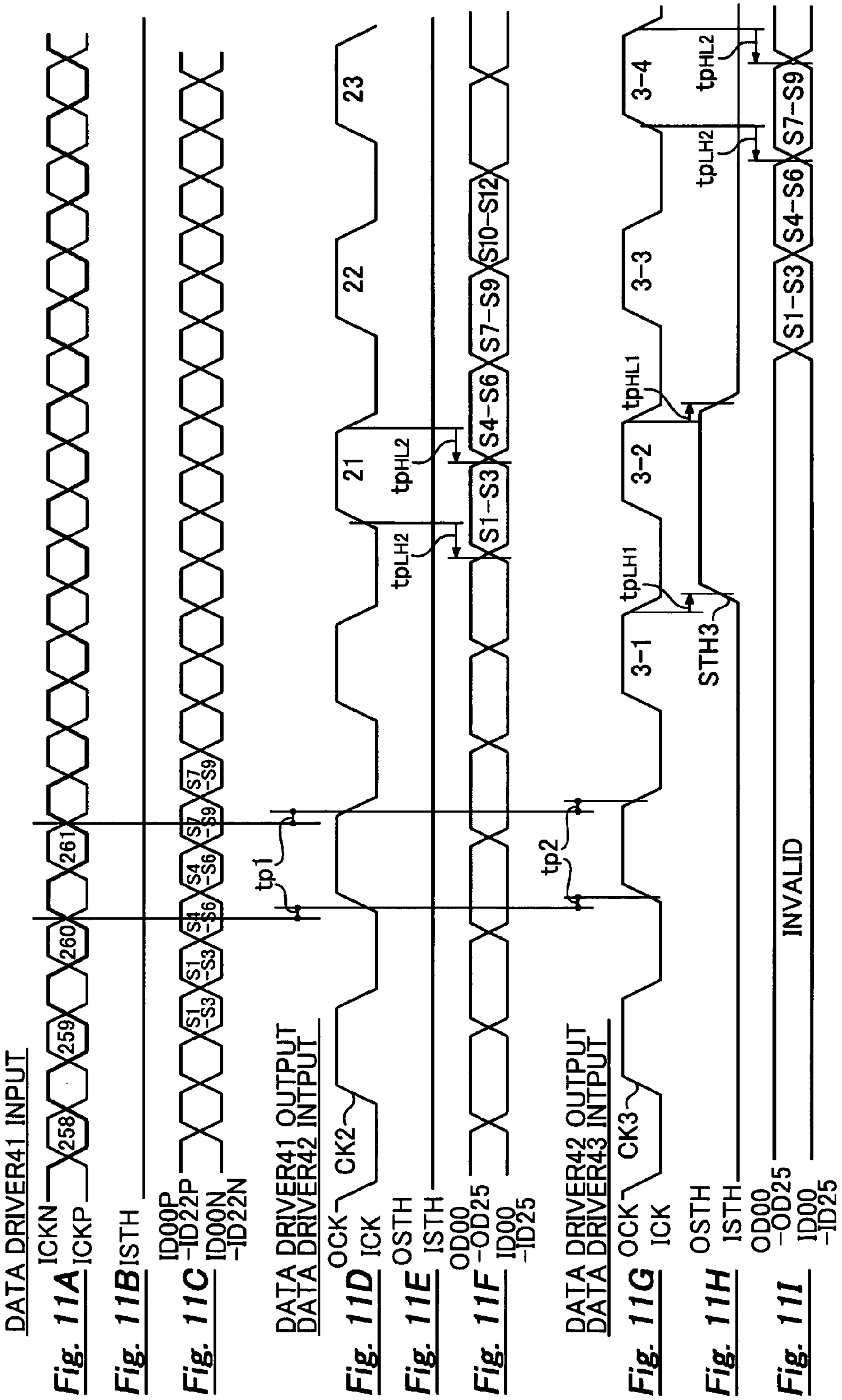
FIGS. 11A-11I are timing charts that illustrate an interchip transfer of a clock signal, display data, and so forth between the data drivers shown in FIG. 10.

The clock signal CKN/CKP is input to the data driver 41 with the timing shown in FIG. 11A as a 75-MHz RSDS signal, for example and display data DN/DP is input with the timing shown in FIG. 11C in sync with the clock signal CKN/CKP. Display data DN/DP for the outputs S1 to S3 of the data driver 43 shown in FIG. 11C are input in correspondence with the $259^{th}$ clock signal CKN/CKP shown in FIG. 11A and display data DN/DP for the outputs S4 to S6 of the data driver 43 are similarly input in correspondence with the $260^{th}$ clock signal CKN/CKP. Further, the start signal STH1 is input to data driver 41 with advanced timing as shown and, in FIG. 11B, the ISTH signal is at the "L" level.

The clock signal CKN/CKP is divided by the receiver 20 in the data driver 41 to render a 37.5 MHz clock signal CK1 (not shown) and transferred within the data driver 41 and a clock signal CK2 is input to data driver 42 with the delay $t=t_{P1}$ ($t_{P1}$=15 ns, for example) from the clock signal CKN/CKP as shown in FIG. 11D. The display data DN/DP is divided by the receiver 20 in the data driver 41 to render 37.5 MHz display data DA (not shown) and is transferred within the data driver 41 and, as shown in FIG. 11F, is input to data driver 42 with the delay $t=t_{PLH2}$ ($t_{PHL2}$) from the clock signal CK2 ($t_{PLH2}$, $t_{PHL2}$=−3 to +1 ns, for example). The display data DA for the outputs S1 to S3, S4 to S6 of the data driver 43 shown in FIG. 11F are input in correspondence with the 2-1th clock signal CK2 shown in FIG. 11D and, similarly, the display data DA for the outputs S7 to S9, and S10 to S12 of the data driver 43 are input in correspondence with the 2-2th clock signal CK2. Further, the start signal STH1 is transferred within the data driver 41 and input with advanced timing as shown to the data driver 42 as the start signal STH2. In FIG. 11E, the ISTH terminal is at the "L" level.

The clock signal CK2 is transferred within the data driver 42 and input to the data driver 43 with the delay $t=t_{P2}$ ($t_{P2}$=15 ns, for example) from the clock signal CK2 as shown in FIG. 11G as the clock signal CK3. The start signal STH2 is transferred within the data driver 42 and input at the leading edge of the delay t=tPLH1 (tPLH1=−3 to +1 ns, for example) from the trailing edge of the 3-1th clock signal CK3 and at the leading edge of the delay t=PHL1 (tPHL1=−3 to +1 ns, for example) from the trailing edge of the 3-2th clock signal CK3 as the start signal STH3. The display data DA is transferred within the data driver 42 and, as shown in FIG. 11I, is input to the data driver 43 with the delay $t=t_{PLH2}$ ($t_{PHL2}$) from the clock signal CK3. The display data DA for the outputs S1 to S3 and S4 to S6 of the data driver 43 shown in FIG. 11G are input in correspondence with the 3-3th clock signal CK3 shown in FIG. 11G and, similarly, the display data DA for the outputs S7 to S9 and S10 to S12 of the data driver 43 are input in correspondence with the 3-4th clock signal CK3.

Figure 12:
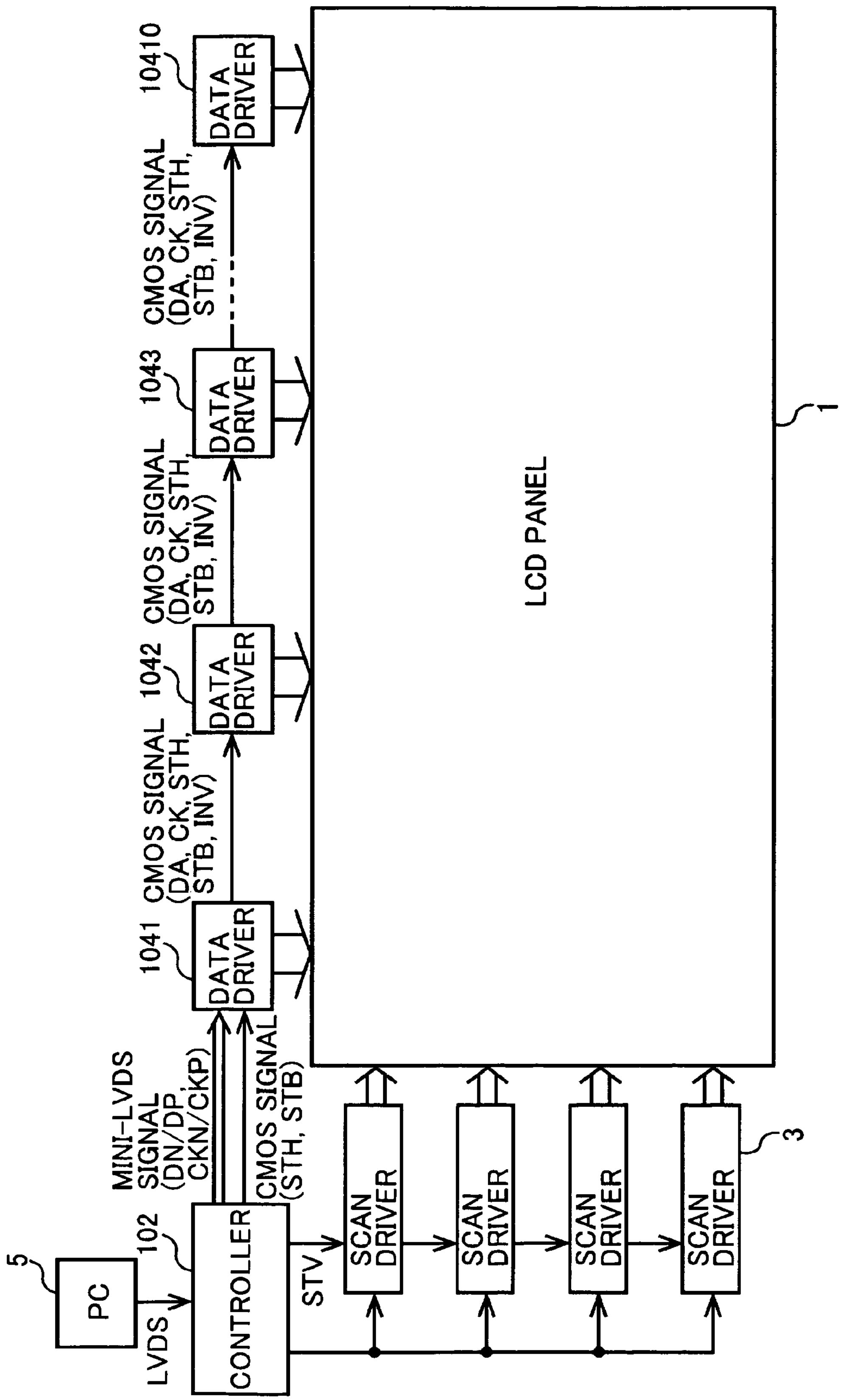
FIG. 12 is a block diagram showing the overall constitution of the liquid-crystal display module of a second embodiment of the present invention.

The second embodiment of the present invention will be described next with reference to FIG. 12. Further, the same reference numerals have been assigned to the same parts as those of FIG. 1 and are not described here. The difference with respect to the liquid crystal display device of FIG. 1 is that the second embodiment comprises a controller 102 and data driver 104 instead of the controller 2 and data driver 4 and the display data DN/DP and clock signal CKN/CKP consisting of a min-LVDS signal are transferred by controller 102 to an initial-stage data driver 1041 by using an interface of a min-LVDS (registered trademark of TEXAS INSTRUMENTS) system instead of an RSDS interface as the interface for the small-amplitude differential signal system. The data driver 104 can employ the same circuit constitution as that of the data driver 4 shown in FIG. 2 except for the fact that a min-LVDS receiver is used instead of the RSDS receiver 21 of the receiver 20 and an illustration and description of the circuit constitution of the data driver 104 is duly omitted here.

Figure 13:
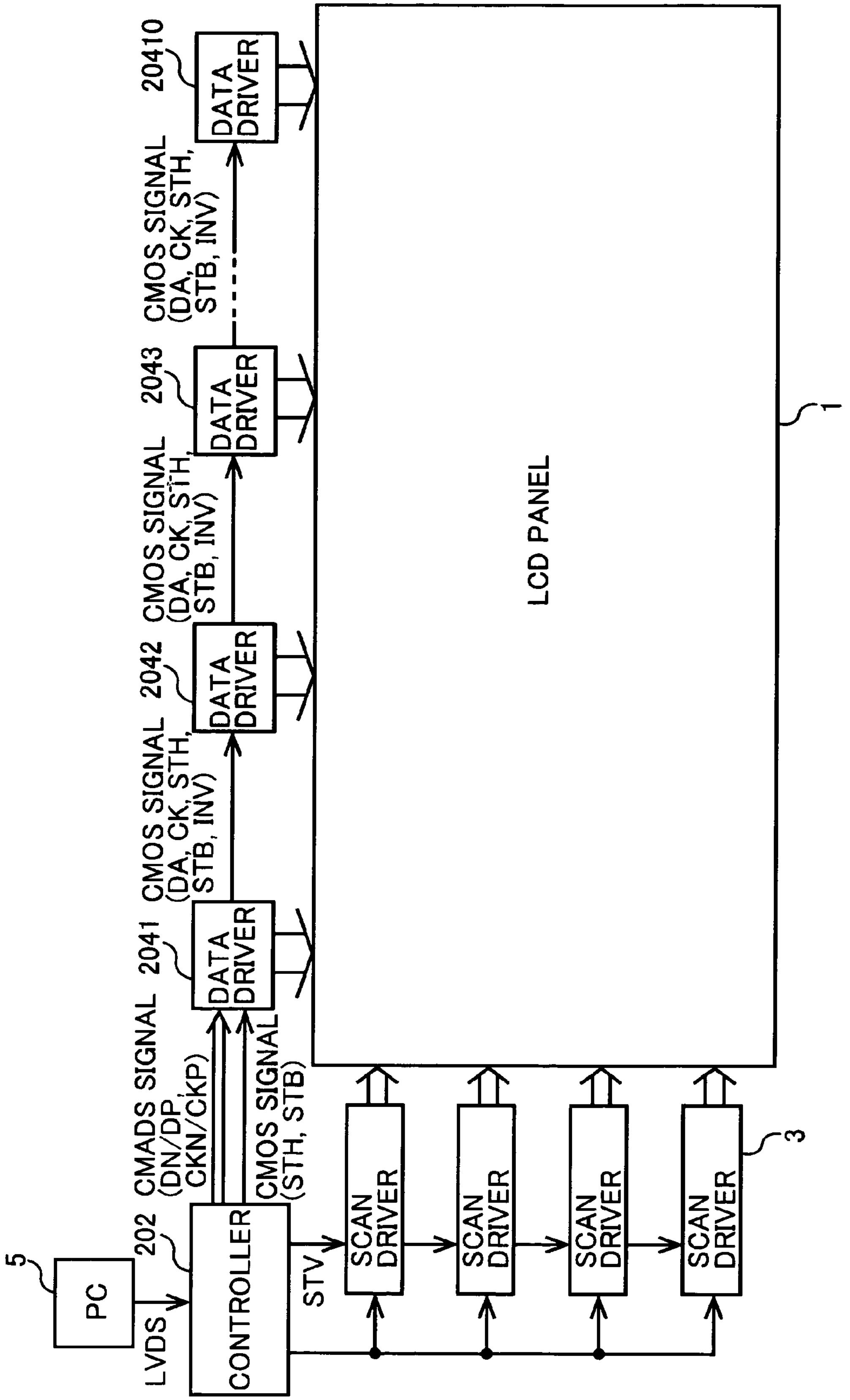
FIG. 13 is a block diagram showing the overall constitution of the liquid crystal display module of a third embodiment of the present invention.

The third embodiment of the present invention will be described next with reference to FIG. 13. Further, the same symbols as those in FIG. 1 have been assigned and a description thereof will be omitted here. The difference from the liquid crystal display device of FIG. 1 is that the third embodiment comprises a controller 202 and data driver 204 instead of the controller 2 and data driver 4 and the display data DN/DP and clock signal CKN/CKP consisting of a CMADS signal are transferred by controller 202 to an initial-stage data driver 2041 by using an interface of the CMADS (Current Mode Advanced Differential Signaling: registered trademark of Nippon Electric (Corp)) system instead of an RSDS interface as the interface for the small-amplitude differential signal system. The data driver 204 can employ the same circuit constitution as that of the data driver 4 shown in FIG. 2 except for the fact that a CMADS receiver is used instead of the RSDS receiver 21 of the receiver 20 and an illustration and description of the circuit constitution of the data driver 204 is duly omitted here.

As described in the first to third embodiments hereinabove, in an interchip transfer of display data and a timing signal, and so forth, same are transferred by the controller to the initial-stage data driver by using one of an RSDS signal, a min-LVDS signal and a CMADS signal as a small-amplitude differential signal and are transferred by using a CMOS signal with a long cycle and large amplitude (driving capacity) by means of a small-amplitude differential signal between data drivers with a large wiring resistance in comparison with between the controller and initial-stage data driver, and, therefore, a setup/hold margin when the display data is captured at the edge of the clock signal by the second and subsequent data drivers can be adequately obtained. Further, because the CMOS signal interface is used without using the small-amplitude differential signal interface in the transfer of display data between data drivers, a fixed current for transmitting a small-amplitude differential signal need not flow. In addition, when display data is transferred by means of a CMOS signal to the second and subsequent-stage data drivers, the display data is subjected to first-order inversion by means of at least the initial-stage data driver by means of the data inversion signal generated by the initial-stage data driver and the display data is subjected to second-order inversion by at least the second and subsequent-stage data drivers. Therefore, the EMI noise and current consumption, and so forth, caused by the inversion of the previous and subsequent data during a data transfer can be reduced.

Further, an RSDS receiver, min-LVDS receiver and CMADS receiver were described by way of example as the receivers used in the data drivers in the embodiment above. However, the present invention is not limited to or by such receivers. A receiver can be applied as long as same is capable of converting a small-amplitude differential signal into a CMOS signal, Further, although a liquid crystal display device was described by way of example, the present invention is not limited to or by a liquid-crystal device and can also be employed in another display devices that transfer clock signals, display data, and so forth, between chips. Further, the present invention is not limited to a display device and can also be employed in another electronic device that uses a data transfer method in which data from a first semiconductor integrated circuit device is sequentially transferred to a plurality of cascade-connected second semiconductor integrated circuit devices.

It is apparent that the present invention is not limited to the above embodiment and it may be modified and changed without departing from the scope and spirit of the invention.

What is claimed is:

1. A data transfer method for sequentially transferring data from a first semiconductor integrated circuit to a plurality of cascade-connected second semiconductor integrated circuits, wherein the data is transferred between the first semiconductor integrated circuit and an initial-stage second semiconductor integrated circuit by means of a differential signal and the data is transferred between each of the second semiconductor integrated circuits by means of a CMOS signal sequentially, wherein each of the second integrated circuits comprises:

a differential signal receiver which enters an operational state or a non-operational state in accordance with an interface mode select signal;

a bypass circuit which bypasses the CMOS signal in accordance with the interface mode select signal when the differential signal receiver is in the non-operational state and prohibits bypassing of the CMOS signal in accordance with the interface mode select signal when the differential signal receiver is in the operational state; and a selector which selects and outputs either of a signal output from the differential signal receiver or a signal output from the bypass circuit in accordance with the interface select signal, wherein, in each of the second semiconductor integrated circuits, either the differential signal or CMOS signal can be receivably selected as the data in accordance with the interface mode select signal, wherein, in the initial-stage second semiconductor integrated circuit, the differential signal is selected and the received differential signal is converted into the CMOS signal for each bit and transmitted to a second-stage second semiconductor integrated circuit, and wherein, in the second-stage second semiconductor integrated circuit, the CMOS signal is selected and the received CMOS signal is sequentially transmitted "as is" to third- and subsequent-stage second semiconductor integrated circuits.

2. The data transfer method according to claim 1, wherein the CMOS signal converted from the differential signal is divided into at least two with respect to the differential signal.

3. The data transfer method according to claim 1, wherein, in the initial-stage second semiconductor integrated circuit, a previous and subsequent inversion is detected for each bit of the CMOS signal converted from the differential signal, a data inversion signal corresponding with a number of bits of the inversion is generated, and the CMOS signal converted from the differential signal is subjected to a first-order inversion in accordance with the data inversion signal and transmitted to the second-stage second semiconductor integrated circuit together with the data inversion signal; and wherein, in the second- and subsequent-stage second semiconductor integrated circuits, the received CMOS signal is subjected to a second-order inversion in accordance with the data inversion signal.

4. The data transfer method according to claim 1, wherein the differential signal is one of a Reduced Swing Differential Signaling (RSDS) signal, mini-Low Voltage Differential Signaling (mini-LVDS) signal, or Current Mode Advanced Differential Signaling (CMADS) signal.

5. The data transfer method according to claim 1, wherein the cascade-connected second semiconductor integrated circuits comprise a series of data driver stages.

6. The data transfer method according to claim 1, wherein the cascade-connected second semiconductor integrated circuits comprise a series of data driver stages of a same type of data driver circuit.

7. The data transfer method according to claim 1, wherein the cascade-connected second semiconductor integrated circuits are provided on a data-side driver circuit.

8. An electronic device, comprising:

a first semiconductor integrated circuit; and a plurality of cascade-connected second semiconductor integrated circuits for receiving data from the first semiconductor integrated circuit and sequentially transferring the data, wherein each of the second semiconductor integrated circuits comprises:

a differential signal receiver which enters an operational state or a non-operational state in accordance with an interface mode select signal;

a bypass circuit which bypasses a CMOS signal in accordance with the interface mode select signal when the differential signal receiver is in the non-operational state and prohibits bypassing of the CMOS signal in accordance with the interface mode select signal when the differential signal receiver is in the operational state; and a selector which selects and outputs either of a signal output from the differential signal receiver or a signal output from the bypass circuit in accordance with the interface select signal, and wherein the data is transferred by a differential signal between the first semiconductor integrated circuit and an initial-stage second semiconductor integrated circuit and is transferred by the CMOS signal between each of the second semiconductor integrated circuits.

9. The electronic device according to claim 8, wherein the receiver comprises a divider circuit that divides the CMOS signal from the differential signal receiver into at least two with respect to the differential signal and outputs same as individual one-bit parallel CMOS signals.

10. The electronic device according to claim 8, wherein the second semiconductor integrated circuit comprises:

a data inversion signal generation circuit that detects previous and subsequent inversion for each bit of the parallel CMOS signals and generates a data inversion signal corresponding with a number of bits of the inversion;

a data first-order inversion circuit that subjects the parallel CMOS signals to first-order inversion in accordance with the data inversion signal; and a data second-order inversion circuit that subjects the CMOS signals thus subjected to the first-order inversion to second-order inversion in accordance with the data inversion signal.

11. The electronic device according to claim 8, wherein the differential signal comprises one of a Reduced Swing Differential Signals' (RSDS) signal, a mini-Low Voltage Differential Signaling (mini-LVDS) signal, or Current Mode Advanced Differential Signaling (CMADS) signal.

12. The electronic device according to claim 8, wherein the electronic device comprises a display device, wherein the first semiconductor integrated circuit comprises a control circuit, and wherein the second semiconductor integrated circuit comprises a data-side driver circuit.

13. The electronic device according to claim 12, wherein the electronic device comprises a liquid-crystal display device.

14. A liquid crystal display (LCD) module, comprising:

a plurality of subsequent data drivers, each of the plurality of subsequent data drivers being cascade-connected; and a controller configured to receive display data and a timing signal and to transmit a horizontal synchronization start signal and a latch signal to an initial stage data driver, wherein the initial stage data driver transmits display data to a first one of said plurality of subsequent data drivers, wherein the display data is sequentially transferred between the remaining pluralities of subsequent data drivers, wherein each of the subsequent data drivers comprises:

a differential signal receiver which enters an operational state or a non-operational state in accordance with an interface mode select signal;

a bypass circuit which bypasses a CMOS signal in accordance with the interface mode select signal when the differential signal receiver is in the non-operational state and prohibits bypassing of the CMOS signal in accordance with the interface mode select signal when the differential signal receiver is in the operational state; and a selector which selects and outputs either of a signal output from the differential signal receiver or a signal output from the bypass circuit in accordance with the interface select signal.

15. The LCD module of claim 14, wherein the display data is transferred via a CMOS signal wherein the display data is transferred by a differential signal between the controller and the initial stage data driver and is transferred by the CMOS signal between each of the remaining pluralities of subsequent data drivers.

16. The LCD module of claim 14, wherein each of the plurality of subsequent data drivers comprises a plurality of input terminals to receive the display data, wherein each of the plurality of subsequent data drivers except for a last data driver of the plurality of sequential data drivers comprises an output terminal to transmit the display data to a respective sequential data driver.

* * * * *